United States Patent

Gonzalez Gallegos et al.

[11] Patent Number: 5,975,733
[45] Date of Patent: Nov. 2, 1999

[54] LAMP FOR A MOTOR VEHICLE, ADAPTED TO BE FITTED FROM OUTSIDE

[75] Inventors: Fermin Gonzalez Gallegos; José Garcia Castilla, both of Creteil, France

[73] Assignee: Valeo Vision, Bobigny Cedex, France

[21] Appl. No.: 08/923,961

[22] Filed: Sep. 5, 1997

[30] Foreign Application Priority Data

Sep. 6, 1996 [FR] France ................................. 96 10895

[51] Int. Cl.⁶ .................................................. F21V 19/00
[52] U.S. Cl. ........................ 362/549; 362/306; 362/368
[58] Field of Search ................................ 362/226, 306, 362/368, 549

[56] References Cited

U.S. PATENT DOCUMENTS

| Re. 20,032 | 7/1936 | Douglas | 362/306 |
| 591,490 | 10/1897 | Palm | 362/226 |
| 3,460,728 | 8/1969 | Adamson | 362/549 |
| 3,476,928 | 11/1969 | Greasley | 362/549 |
| 3,814,928 | 6/1974 | Grosseau | 362/549 |
| 4,358,234 | 11/1982 | Takegawa et al. | 411/80.2 |
| 4,644,179 | 2/1987 | Pointout et al. | 335/131 |
| 5,077,650 | 12/1991 | Cestari | 362/368 |

FOREIGN PATENT DOCUMENTS 195 20 313   5/1996   Germany .

*Primary Examiner*—Alan Cariaso
*Attorney, Agent, or Firm*—Morgan & Finnegan, L.L.P.

[57] ABSTRACT

A lamp for a motor vehicle, such as an indicator lamp for mounting on a flank of the vehicle, comprising a lamp body, a fastening piece behind the lamp body, and at least one screw inserted through a hole in the fastening piece from behind, the screw being received in a threaded hole in the lamp body. The lamp body has at least two external side faces which are divergent from each other towards the front of the lamp. Each of these side faces terminates in a flange which is oriented at right angles to an axis of the lamp. The fastening piece has at least two deformable lugs in contact with the external side faces of the lamp body, and these lugs have an end which is spaced away from the flange before the screws are tightened and is close to the flange after they have been tightened.

21 Claims, 2 Drawing Sheets

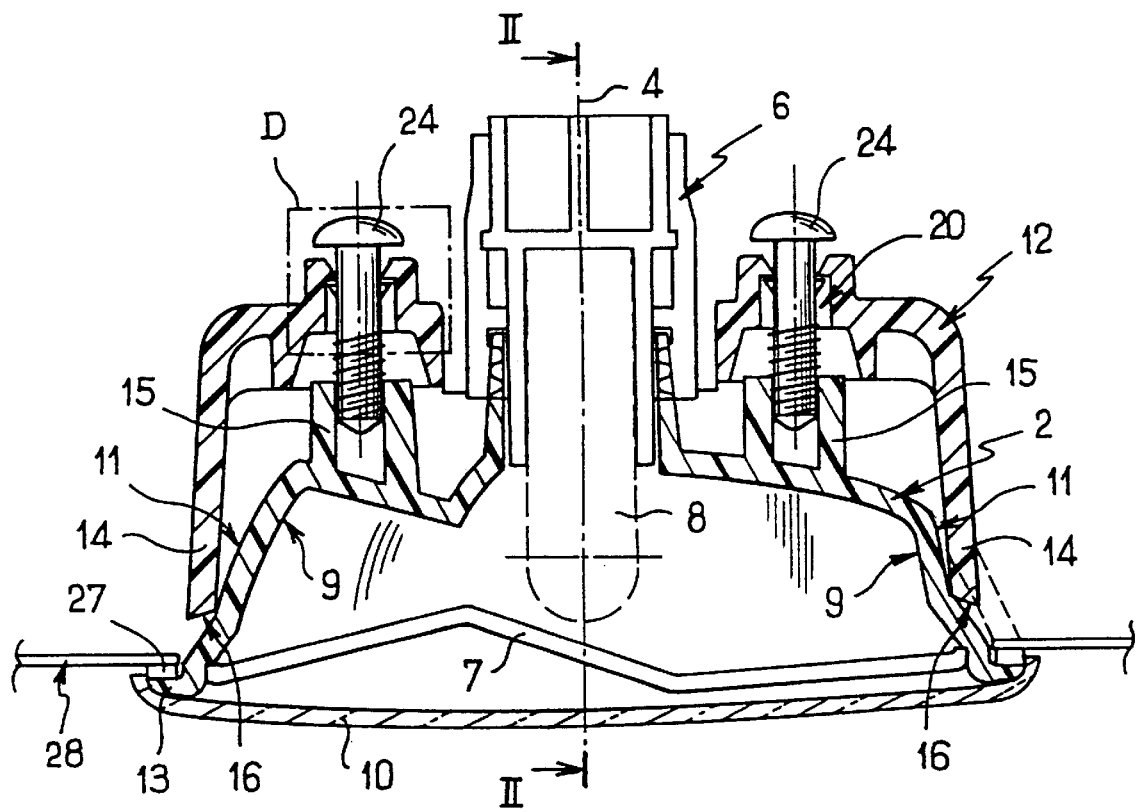
FIG_1
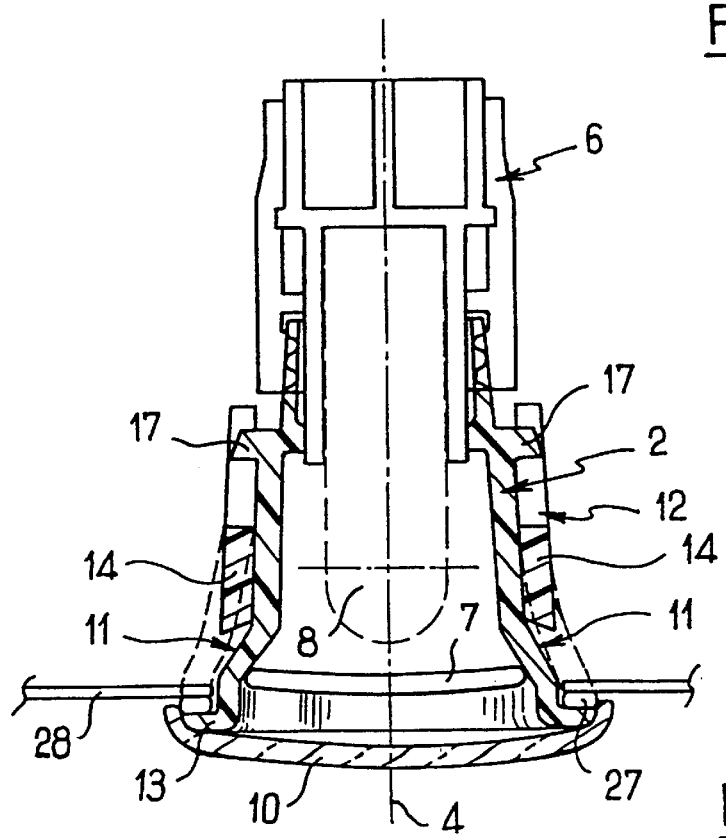
FIG_2

LAMP FOR A MOTOR VEHICLE, ADAPTED TO BE FITTED FROM OUTSIDE

FIELD OF THE INVENTION

This invention relates to lamps for motor vehicles.

BACKGROUND OF THE INVENTION

Motor vehicle lamps, such as indicators for various purposes, which are designed to be fitted on the vehicle by introducing the lamp into its seating from inside the vehicle and fastening the lamp from inside the vehicles. Such arrangements make it necessary to have sufficient access available from inside the vehicle. Such access is however not always available, and there exist today some models of vehicles in which it is necessary to fit lamps from outside, with no access being available to the lamp from inside the vehicle except by means of a screwdriver. The above mentioned known types of lamp are incompatible with such a situation.

SUMMARY OF THE INVENTION

An object of the invention is to provide a lamp which is able to be fitted in place from outside the vehicle and fixed to the vehicle when no access from inside the vehicle is available except with a screwdriver.

According to an aspect of the invention, a lamp for a motor vehicle, comprising a body, comprises a fastening piece adapted to be disposed behind the body, and at least one screw extending through a through hole in the fastening piece from the rear of the lamp so as to be received in at least one threaded hole in the body of the lamp, the body having at least two external side faces which are divergent from each other towards the front of the lamp, with each of these side faces terminating in a flange which is oriented at right angles to an axis of the lamp, the fastening piece having at least two deformable lugs which are in contact with the external side faces of the lamp body, these side lugs having an end which is spaced away from the flange before tightening of the said screw or screws, and close to the flange after the screw or screws have been tightened.

Thus the lamp is introduced into its seating from outside the vehicle and the flange is engaged on the outer surface of the vehicle bodywork. The side lugs of the fastening piece are inside the vehicle. Tightening of the screws, which is carried out from inside the vehicle using a screwdriver, displaces the fastening piece for the lamp body towards the front of the lamp. The outer side faces of the lamp body constitute guide ramps for the side lugs as they are displaced forwardly. During the tightening operation, the side lugs in engagement on the side faces spread away from each other. The ends of the lugs then come into engagement on the inside surface of the bodywork, so that the latter is gripped between the flange on the outside and the ends of the side lugs on the inside. The lamp is now securely fastened to the bodywork. The diverging movement of the lugs as the screws are tightened enables the lamp to be introduced into its seating from outside, and secures the lamp from inside against movement.

The side lugs are preferably elastically flexible. Thus, it is possible to remove the lamp by unscrewing the screws. The lugs then perform a convergent movement towards each other, which enables the lamp to be subsequently drawn out of its seating.

The lamp preferably includes fastening means for snap-fitting the fastening piece to the lamp. Thus, these fastening means are independent of the screws, so that even if they are unscrewed totally from the threaded holes in the lamp body, there is no possibility of the fastening piece falling away inside the vehicle.

Each screw, and the corresponding through hole in the fastening piece, preferably comprise a fastening means for snap-fitting the screw to the fastening piece. Then, even when unscrewed, the screw remains captive on the fastening piece. The screw can then be totally unscrewed from the threaded hole in the body without falling out within the vehicle.

Preferably, for rendering each screw captive in this way, the screw has a shank which is formed with an external relief, and the through hole has an internal relief, these reliefs being so arranged as to enable the screw to pass into the through hole towards the front of the lamp, but to prevent it from escaping from the hole towards the rear of the lamp. Thus, after the relief on the screw has been forced past the relief in the through hole, the latter is interposed between the head of the screw and the relief on the shank of the screw, so that the screw is retained in position in the through hole of the fastening piece.

The lamp preferably includes a sealing gasket disposed on the flange of the lamp body, facing towards the lugs. The fitting of the lamp in the manner set forth above thus also seals the junction between the lamp and the bodywork.

According to the invention in a second aspect, a motor vehicle having a body element is provided with at least one lamp in accordance with the first aspect of the invention, the lamp being fixed to the body element by gripping the body element between the ends of the said side lugs and the flange of the lamp body.

Further features and advantages of the invention will appear more clearly upon a reading of the following detailed description of a preferred embodiment of the invention, which is given by way of non-limiting example only and with reference to the accompanying drawings.

BRIEF DESCRIPTION OF THE DRAWINGS

FIG. 1 is a view in axial cross section of a lamp according to the invention, mounted on a vehicle.

FIG. 2 is a view of the same lamp, in cross section taken on the line II—II in FIG. 1.

DESCRIPTION OF A PREFERRED EMBODIMENT OF THE INVENTION

Figure 3:
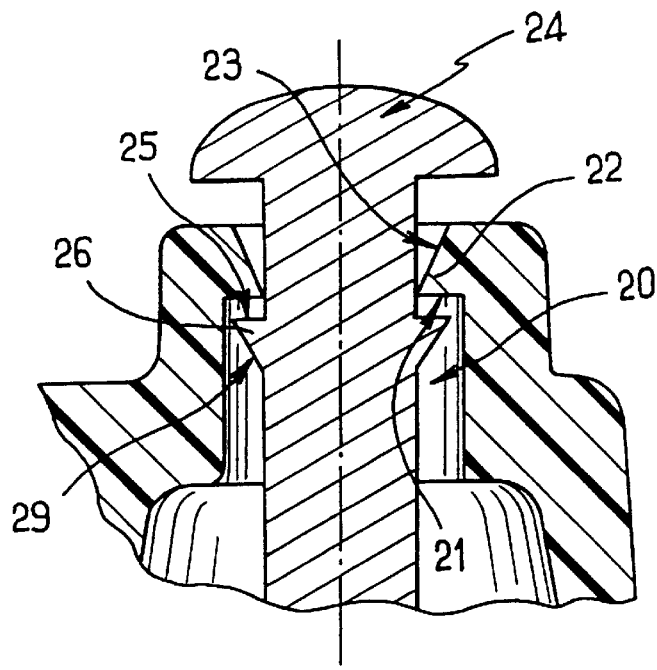
FIG. 3 is a scrap view on a larger scale, showing the detail indicated by a phantom box at D in FIG. 1.

Referring first to FIGS. 1, 2 and 3, the lamp shown is a direction indicator side repeater lamp which is designed to be mounted on a flank of a motor vehicle. The lamp comprises a body 2 of plastics material, having a central axis 4 extending from the front of the lamp to the back. At the back, the lamp also includes a bulb carrier, or lampholder, 6 which is fixed to the body 2 on the axis 4 in a central housing of the body. The bulb carrier 6 carries a bulb 8. The body 2 has an internal face 9 which serves as a reflector for the bulb 8. As seen in FIGS. 1 and 2, the body 2 has a length which is greater than its width. It has four outer side faces 11 opposed to the internal face 9, namely two faces opposed to each other along the length of the body and divergent from each other towards the front of the lamp (these two faces being visible in cross section in FIG. 1), and two faces opposed to each other along the width of the body, again divergent from each other towards the front of the lamp. They are shown in cross section in FIG. 2. The outer side faces 11 are continuous with each other, and each outer side face 11 terminates in a peripheral annular flange 13 which is oriented at right angles to the central axis 4. In the front of the lamp there is an optic or cover glass 10, which closes the front of the reflector and is in contact with the front or outer face of the flange 13. The lamp also includes an intermediate screen 7 which extends across the reflector.

With reference to FIG. 1 in particular, the body 2 of the lamp has two threaded bosses 15 which are arranged on either side of the lamp holder or bulb carrier 6, being spaced apart along the length of the body 2. The axis of the threaded bosses 15 is parallel to the central axis 4. With reference to FIG. 2, the body 2 has two profiled lugs 17 disposed on the two outer faces 11 which are opposed to each other along the width of the body 2. The lugs 17 extend to the vicinity of the bulb carrier 6, following the longitudinal direction of the body 2.

Figure 4:
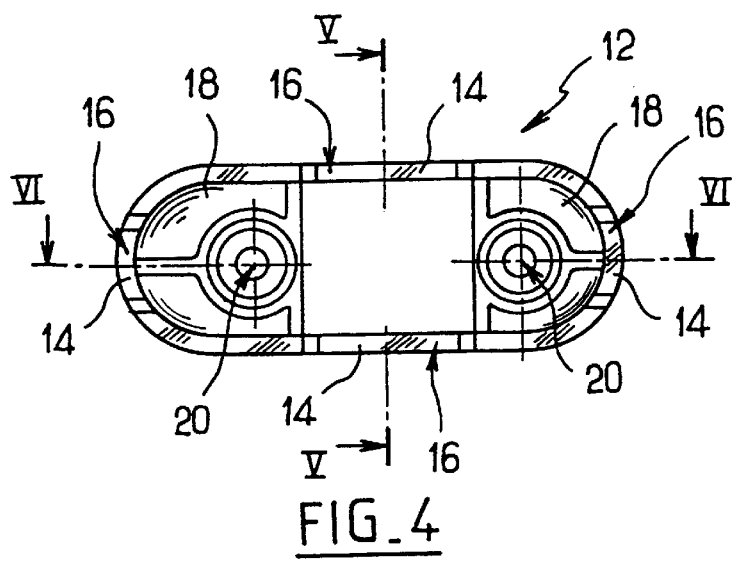
FIG. 4 is a front view of the fastening piece.
Figure 5:
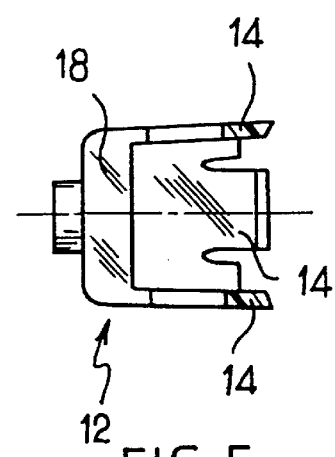
FIG. 5 again shows the fastening piece, here in cross section taken on the line V—V in FIG. 4.
Figure 6:
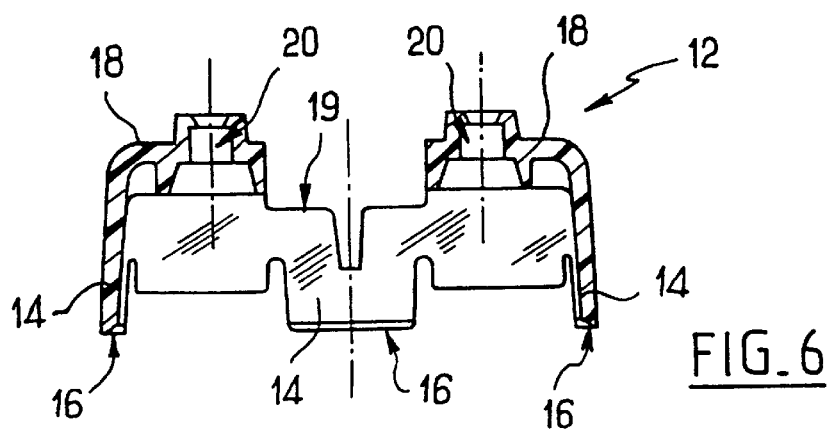
FIG. 6 is another view of the fastening piece, in cross section taken on the line VI—VI in FIG. 4.

With reference in particular to FIGS. 4 to 6, the lamp further includes a fastening piece 12 of plastics material. This piece is in the form of an oval crown having a length greater than its width, and includes four deformable side lugs which are resiliently flexible, namely two lugs opposed to each other along the length of the fastening piece, and two lugs opposed to each other along the width of the piece. The four lugs 14 have free ends 16 which lie on a common side of the crown, this side being arranged to be oriented towards the front of the lamp. On the opposite side of the crown, and oriented towards the rear of the lamp, the fastening piece includes two base walls 18 adjacent to the longitudinal ends of the crown. Each of these base walls 18 has a through hole 20 on an axis parallel to the side lugs 14.

The fastening piece 12 is adapted to be fitted behind the lamp body 2, with the ends 16 of the side lugs 14 making contact with the respective external side faces 11 of the body, the four lugs 14 being spaced apart around the periphery of the body. The fastening piece 12 is fixed to the body 2 by snap-fitting the lugs 17 on an edge 19 of the crown which is adjacent to the base walls 18. The lugs 17 thus constitute fastening means for snap-fitting the fastening piece to the body 2.

With reference to FIG. 3, each through hole 20 has an internal annular retaining projection in the form of a rib or nib 22 which projects within the hole 20. Each of these nibs 22 has a forward-facing flat face 21 at right angles to the axis of the through hole 20, and a rearwardly facing frustoconical face 23, these faces 23 being convergent towards the front of the lamp.

The lamp includes two screws 24, each having a head, a shank, and an annular collar portion 26 adjacent to the head of the screw and projecting from the shank of the latter. The collar portion 26 has a flat face 25 at right angles to the axis of the screw and adjacent to the head of the screw, so as to face towards the rear, together with a frusto-conical face 29 which is convergent towards the free end of the shank of the screw, so that the frusto-conical face 29 faces towards the front of the lamp. Each screw 24 passes through a respective one of the two through holes 20 in the fastening piece, into which it is inserted from the back of the lamp, and is received in a respective one of the threaded holes 15 in the body 2. Each of these screws is introduced into its hole 20 by forcing the collar portion 26 past the annular projection 22, which enables the collar portion 26 to pass towards the front of the lamp, but prevents it from being withdrawn towards the rear. The collar portion 26 and the projection 22 thus constitute fastening means whereby each screw 24 is made captive by snap-fitting to the fastening piece 12. When the screws have been snap-fitted in place, the annular projections 22 lie interposed between the collar portions 26 and the heads of the screws.

Before the screws are tightened, the ends 16 of the side lugs 14 are spaced away from the peripheral annular flange 13. The flange 13 carries, on the side facing towards the side lugs 14, a sealing gasket 27, FIGS. 1 and 2. In order to fit the lamp on the vehicle, with the screws 24 being essentially, or totally, unscrewed from the threaded bosses 15, the lamp is introduced from the outside of the vehicle into a seating in the bodywork 28 of the vehicle. This brings the gasket 27 into engagement against the outer face of the body panel. The two screws 24 are then tightened from inside the vehicle using a screwdriver. In consequence, the fastening piece 12 is drawn towards the body 2, i.e. towards the front of the lamp.

The outer side faces 11 of the body constitute guide ramps for the ends 16 of the side lugs 14 as the latter are displaced towards the front of the lamp. During the tightening operation, the side lugs 14 in engagement on the outer faces 11, move further away from each other by flexing in a divergent manner. The ends 16 of the side lugs then come into engagement against the inside face of the body panel, which causes the sealing gasket 27 to become compressed between the flange 13 and the body panel 28.

After this tightening operation, the ends 16 of the side lugs 14 lie close to the flange 13. This position of the side lugs is indicated in broken lines in the drawings. The body panel is thus gripped between the flange 13 and the sealing gasket 27 on the outside, and between the flange 13 and the ends 16 of the side lugs 14 on the inside. In this way the lamp is fastened to the bodywork, and sealing between the lamp and the bodywork around the lamp seating in the latter is assured.

The ends 16 of the lugs 14 are slighty chamfered towards the axis 4 of the lamp, so as to give good contact with the body panel having regard to the outward flexing of the lugs during the tightening operation.

Since the side lugs 14 are resiliently flexible, removal of the lamp is carried out by performing the above mentioned operations in the reverse order.

Numerous modifications can of course be applied to the invention without departing from the scope of the latter. Thus, the lamp may have only one screw, one through hole and one threaded boss. Again, it may have only two side lugs and two outer side faces.

Fastening of the fastening piece to the body of the lamp could be carried out by means of the screws 24 by starting to screw them into the threaded bosses in the lamp body, in which case means for snap-fitting the fastening piece to the lamp body may be omitted.

The lamp may be a front or rear lamp, and the vehicle may have a number of the lamps in accordance with the invention.

What is claimed is:

1. A motor vehicle lamp comprising:

a lamp body defining an axis;

the lamp body having at least one threaded hole and at least two external side faces divergent from each other towards a front portion of the lamp, and a flange terminating each said side face;

the flange being oriented at or about a right angle to the axis;

a fastening piece adapted to be disposed at a rear portion of the lamp body and having at least one through hole and at least two lugs, each said lug having an end; and at least one screw extending through said through hole in the fastening piece from the rear of the lamp so as to be received in at least one of said threaded hole in the lamp body, the screw being adapted to be tightened into a corresponding said threaded hole, the lugs being in contact with the side faces of the lamp body, wherein the lugs are spaced away from the flange before the tightening of the screw, and close to the flange after the tightening.

2. A lamp according to claim 1, wherein the lugs are elastically flexible.

3. A lamp according to claim 1, further comprising means for fastening the fastening piece to the lamp by snap-fitting.

4. A lamp according to claim 1, wherein each said screw and the corresponding through hole in the fastening piece define means for fitting the screw to the fastening piece by snap-fitting, wherein the screw is then captive in the fastening piece.

5. A lamp according to claim 4, wherein said screw includes a shank having an external relief, the through hole having an internal relief, the reliefs being adapted to enable the screw to be passed into the through hole towards the front of the lamp and to prevent the screw from passing towards the rear of the lamp.

6. A lamp according to claim 5, wherein each said relief is annular and has a frusto-conical face and a flat face.

7. A lamp according to claim 1, further comprising a sealing gasket disposed on the flange of the lamp body facing towards the lugs.

8. A lamp according to claim 1, further comprising a lamp holder for carrying a bulb, the lamp holder fixed to the lamp body on the axis, wherein the lamp body having two said screws, two said through holes and two said threaded holes disposed on either side of the lamp holder.

9. A lamp according to claim 1, further comprising four said lugs spaced apart on the periphery of the lamp body.

10. A lamp according to claim 1, wherein the end of each said lug is chamfered towards the axis.

11. A motor vehicle lamp comprising:

a lamp body defining an axis and having an internal face which serves as a reflector;

the lamp body having at least one threaded hole and at least two external side faces divergent from each other towards a front portion of the lamp, and a flange terminating each said side face;

the flange being oriented at or about a right angle to the axis and having an inner face and an outer face;

a fastening piece adapted to be disposed at the a rear portion of the lamp body and including at least one through hole, the through hole having an internal relief, and at least two deformable lugs spaced apart on the periphery of the lamp body, the lugs being elastically flexible having an end and chamfered toward the axis;

a sealing gasket disposed on the flange of the lamp body facing towards the lugs;

a lamp holder for carrying a bulb fixed to the body on the axis;

a cover glass which covers the reflector and is in contact with the outer face of the flange; and at least one screw extending through said through hole in the fastening piece from the rear of the lamp so as to be received in at least one of said threaded hole in the lamp body, the screw includes a shank having external relief and adapted to be tightened into a corresponding said threaded hole, wherein the reliefs are adapted to enable the screw to be passed into the through hole towards the front of the lamp and to prevent the screw from passing towards the rear of the lamp, and wherein the lugs are spaced away from the flange before the tightening of the screw and close to the flange after the tightening.

12. A motor vehicle including a bodywork element and at least one lamp, the lamp comprising:

a lamp body defining an axis;

the lamp body having at least one threaded hole and at least two external side faces divergent from each other towards a front portion of the lamp, and a flange terminating each said side face;

the flange being oriented at or about a right angle to the axis;

a fastening piece adapted to be disposed at a rear portion of the lamp body and having at least one through hole and at least two lugs, each said lug having an end; and at least one screw extending through said through hole in the fastening piece from the rear of the lamp so as to be received in at least one of said threaded hole in the lamp body, the screw being adapted to be tightened into a corresponding said threaded hole, the lugs being in contact with the side faces of the lamp body, wherein the lugs are spaced away from the flange before the tightening of the screw, and close to the flange after the tightening, and the lamp being fixed to the bodywork element by gripping of the bodywork element between the ends of the lugs and the flange of the lamp body.

13. A vehicle according to claim 12, further comprising a sealing gasket interposed between the lamp and the bodywork element.

14. A method of fitting a motor vehicle lamp including a lamp body and fastening piece having at least two lugs, the fastening piece adapted to be fitted behind the lamp body, the method comprising:

tightening at least one screw attached to the lamp body and fastening piece;

sliding the fastening piece and the fixed lamp body towards an inside face of a body of a motor vehicle;

displacing the lugs away from each other; and engaging the lugs against the inside face of the body of the motor vehicle, wherein the lamp body is fastened to the body of the motor vehicle.

15. The method according to claim 14, wherein the displacing is effected by flexing the lugs.

16. The method according to claim 15, wherein the sliding is effected by tightening at least one screw attached to the lamp body and the fastening piece.

17. The method according to claim 16, further comprising introducing the lamp from outside the motor vehicle into a seating in the body of the motor vehicle.

18. A motor vehicle lamp, including a lamp body and fastening piece having at least two lugs, the fastening piece adapted to be fitted behind the lamp body, comprising:

means for tightening at least one screw attached to the lamp body and fastening piece;

means for sliding the fastening piece and the fixed lamp body towards an inside face of a body of a motor vehicle;

means for displacing the lugs away from each other; and means for engaging the lugs against the inside face of the body of the motor vehicle, wherein the lamp body is fastened to the body of the motor vehicle.

19. The motor vehicle lamp of claim 18, wherein the displacing means is effected by flexing the lugs.

20. The motor vehicle lamp of claim 19, wherein the sliding means is effected by tightening at least one screw attached to the lamp body and the fastening piece.

21. The motor vehicle lamp of claim 20, further comprising:

means for introducing the lamp from outside the motor vehicle into a seating in the body of the motor vehicle.

* * * * *